(12) United States Patent
Chani et al.

(10) Patent No.: US 11,721,455 B1
(45) Date of Patent: Aug. 8, 2023

(54) ORGANIC RESISTOR

(71) Applicant: King Abdulaziz University, Jeddah (SA)

(72) Inventors: Muhammad Tariq Saeed Chani, Jeddah (SA); Abdullah Mohamed Asiri, Jeddah (SA); Mohammed Muzibur Rahman, Jeddah (SA); Tahseen Kamal, Jeddah (SA); Khasan S. Karimov, Jeddah (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 0 days.

(21) Appl. No.: 18/156,716

(22) Filed: Jan. 19, 2023

(51) Int. Cl.
| | |
|---|---|
| *H01C 1/01* | (2006.01) |
| *H01C 7/18* | (2006.01) |
| *H01C 17/065* | (2006.01) |
| *C09D 5/26* | (2006.01) |
| *C09D 5/02* | (2006.01) |
| *C09D 191/00* | (2006.01) |
| *C09D 7/61* | (2018.01) |
| *C09D 7/63* | (2018.01) |
| *C08J 7/044* | (2020.01) |

(Continued)

(52) U.S. Cl.
CPC ............. *H01C 1/01* (2013.01); *B32B 17/063* (2013.01); *C08J 7/042* (2013.01); *C08J 7/044* (2020.01); *C09D 5/028* (2013.01); *C09D 5/26* (2013.01); *C09D 7/61* (2018.01); *C09D 7/63* (2018.01); *C09D 191/00* (2013.01); *H01C 7/18* (2013.01); *H01C 17/065* (2013.01); *B32B 2255/10* (2013.01); *B32B 2255/28* (2013.01); *B32B 2307/302* (2013.01); *B32B 2457/00* (2013.01); *B82Y 30/00* (2013.01); *B82Y 40/00* (2013.01); *C08J 2321/00* (2013.01); *C08J 2491/00* (2013.01)

(58) Field of Classification Search
CPC .......... H01C 1/10; H01C 7/18; H01C 17/065; C09D 7/71; C09D 7/63; C08J 7/044; C08J 7/042; B32B 17/063
See application file for complete search history.

(56) References Cited

U.S. PATENT DOCUMENTS

| | | | |
|---|---|---|---|
| 9,631,989 B1 | 4/2017 | Asiri et al. | |
| 10,994,387 B1 | 5/2021 | Chani et al. | |
| 2010/0075139 A1* | 3/2010 | Kato | C08J 7/044 428/688 |

FOREIGN PATENT DOCUMENTS

| | | |
|---|---|---|
| CN | 106832271 B | 4/2019 |
| CN | 111211301 A | 5/2020 |

(Continued)

OTHER PUBLICATIONS

JP2010080237, Kato et al., machine translation. (Year: 2010).*

(Continued)

*Primary Examiner* — Kyung S Lee
(74) *Attorney, Agent, or Firm* — WCF IP

(57) ABSTRACT

An organic resistor is provided. The organic resistor includes a rubber substrate and a conducting film disposed over the rubber substrate. The conducting film includes a composite of carbon nanotubes and a nickel phthalocyanine complex dispersed in one or more edible oil(s). The present disclosure also relates to a method of making the organic resistor using rubbing-in technology. The organic resistor of the present invention is environmentally friendly and ecologically clean.

14 Claims, 9 Drawing Sheets

(51) Int. Cl.
*C08J 7/04* (2020.01)
*B32B 17/06* (2006.01)
*B82Y 30/00* (2011.01)
*B82Y 40/00* (2011.01)

(56) References Cited

FOREIGN PATENT DOCUMENTS

| | | | |
|---|---|---|---|
| CN | 110194923 B | | 5/2021 |
| JP | 2010-80237 | * | 4/2010 |

OTHER PUBLICATIONS

Khasan S Karimov et al, "Fabrication of Flexible Conductive Films by Rubbing in Technology for Application in Elastic Thermo-Electric Cells", ScienceDirect, Feb. 23, 2019, pp. 424-427, vol. 6.

Khasan S. Karimov et al., "Effect of Pressure on the Electrical Properties of Flexible NiPc Thin Films Fabricated by Rubbing-in Tecnology", Chinese Physics B, 2021, vol. 30, No. 1.

Mutabar Shah et al., "Carbon Nanotubes' nanocompaostie in Humididty Sensors", Solid-State Electronics, Jan. 2012.

* cited by examiner

ORGANIC RESISTOR

TECHNICAL FIELD

The present disclosure relates to an organic resistor, and more specifically, the present disclosure relates to a phthalocyanine-based conducting film organic resistor.

BACKGROUND

A resistor is a passive two-terminal electrical component that implements electrical resistance in a given electrical circuit. Resistors have become an important component in many devices to protect them from getting damaged by limiting the excess current flow. Conventional resistors are made up of inorganic materials that provide considerable resistance and suffer from drawbacks such as high manufacturing cost, complicated processing, and high-temperature fabrication. Further, the inorganic resistors (resistors made of inorganic materials) cause pollution and damage to the environment as they contain non-biodegradable components which cannot be easily disposed. Also, the inorganic resistors are not suitable to work under flexible and shockproof conditions.

In the recent years, organic materials having resistive properties are being increasingly used in a number of electronic devices including thermistors, transistors, and solar cells. For example, carbon nanotubes (CNTs) and graphene-based multifunctional sensors, graphene and orange dye solid electrolyte cells-based humidity sensors, nanocomposites of chitosan-$CuMn_2O_4$ spinel for impedimetric temperature and humidity sensing, nickel phthalocyanine based photo field effect transistor, to name a few. However, there still exists a need develop low-cost, environmentally friendly, simple processing resistors that may be used under flexible conditions and provide shockproof properties.

SUMMARY

The present disclosure relates to an organic resistor. The present disclosure also relates to a method of preparing the organic resistor.

In one aspect of the present disclosure, the organic resistor is disclosed. The organic resistor includes a rubber substrate and a conducting film disposed over the rubber substrate. The conducting film includes a composite of carbon nanotubes and a nickel phthalocyanine complex dispersed in one or more edible oil(s), where a weight ratio (w/w) of the composite to the one or more edible oil(s) is in a range of 2:3 to 3:2. In an embodiment, the organic resistor may be a surface-type structure or a sandwich-type structure. The surface-type resistor has a size in the range of 2:0.7:0.7 $cm^3$, and the sandwich-type resistor has a size in the range of 2:1.5:0.7 $cm^3$. In an embodiment, the conducting film has a thickness in the range of about 20 micrometers ($\mu$m) to about 26 $\mu$m for the surface-type structure and a thickness in the range of about 42 $\mu$m to about 50 $\mu$m for the sandwich-type structure. In an embodiment, the organic resistor may have a stability up to 120 days.

In an embodiment, the conducting film includes a first layer disposed on the rubber substrate and a second layer disposed on the first layer. The first layer includes carbon nanotubes (CNT's) dispersed in a first edible oil and the second layer includes a nickel phthalocyanine complex dispersed in a second edible oil. In some embodiments, a weight ratio of the carbon nanotubes to the first edible oil is 1:1, and a weight ratio of the nickel phthalocyanine complex to the second edible oil is 1:1. In an embodiment, the sandwich-type structure further includes a conductive glass disposed over the second layer.

The carbon nanotubes are selected from single-walled carbon nanotubes (SWCNT), double-walled carbon nanotubes (DWCNT), multi-walled carbon nanotubes (MWCNT), or a combination thereof. In one embodiment, the carbon nanotubes are multi-walled carbon nanotubes. In another embodiment, the multi-walled carbon nanotubes may have a diameter in a range of about 10 nanometers (nm) to 30 nm. In yet another embodiment, the multi-walled carbon nanotubes have a length in a range of 100 to 200 nanometers.

In another aspect of the present disclosure, a method of making the organic resistor is disclosed. The method of making the organic resistor includes depositing the conducting film over the rubber substrate via rubbing-in technology. The conducting film includes a composite of carbon nanotubes and a nickel phthalocyanine complex dispersed in one or more edible oil(s). The weight ratio (w/w) of the composite to the one or more edible oil(s) is in a range of 2:3 to 3:2. In one embodiment, the method includes depositing the conducting film over the rubber substrate at a temperature range of 25-37° C. and at a pressure of 4-10 $g/cm^2$. In an embodiment, The carbon nanotubes are selected from a single-walled carbon nanotube (SWCNT), a double-walled carbon nanotube (DWCNT), a multi-walled carbon nanotube (MWCNT), or a combination thereof. In another embodiment, the carbon nanotubes are multi-walled carbon nanotubes, with a diameter in a range of 10 to 30 nanometers, and a length in a range of 100 to 200 nanometers.

The foregoing as well as other features and advantages of the present disclosure will be more fully understood from the following description, examples, and claims.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
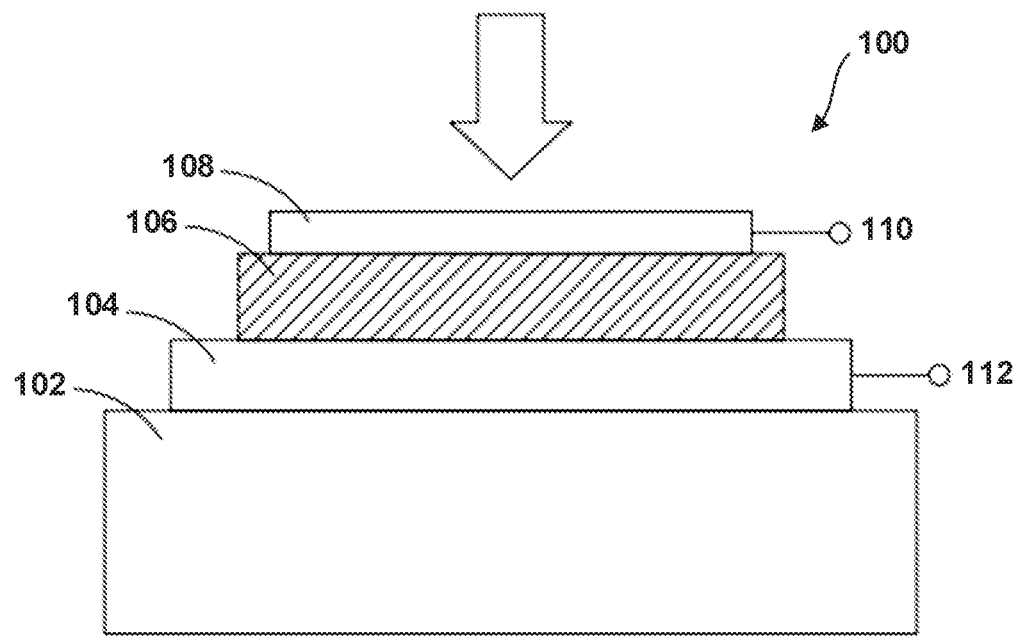
FIG. 1A is a schematic diagram of a sandwich-type structure of an organic resistor.

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements. A skilled artisan will appreciate that various alternate embodiments and forms may be prepared. Examples, therefore, given are only for illustration purposes without any intention to restrict the embodiments to a given set of examples. Specific functional aspects are provided merely to enable a person skilled in the art to perform the invention and should not be construed as limitations of the invention. Any method steps and processes described herein are not to be construed as necessarily requiring their performance in the particular order discussed or illustrated, unless specifically identified as an order of performance. It is also to be understood that additional or alternative steps may be employed, unless otherwise indicated.

As used herein, "substrate" refers to a supporting material upon which or within which the elements of a semiconductor device are fabricated or attached.

As used herein, "nanomaterial" refers to chemical substances or materials having particle sizes between 1 to 100 nanometers (nm) in at least one dimension.

As used herein, "carbon nanotube (CNT)" refers to a single-walled carbon nanotube (SWCNT), a double-walled carbon nanotube (DWCNT), a multi-walled carbon nanotube (MWCNT).

As used herein, "conductive glass" refers to an optically transparent and electrically conductive glass obtained by conductive coatings.

As used herein, "sensitivity" is the change in the electrochemical response with regard to a change in the concentration of the analyte.

As used herein, "amount" refers to the level or concentration of one or more elements or end-products of the system and the methods of the present disclosure.

The use of the singular herein includes the plural (and vice versa) unless specifically stated otherwise.

The use of the terms "include," "includes", "including," "have," "has," or "having," "comprise," "comprises," "comprising" or the like should be generally understood as open-ended and non-limiting unless specifically stated otherwise.

It is understood that the order of steps or order for performing certain actions can be changed so long as the intended result is obtained. Moreover, two or more steps or actions may be conducted simultaneously.

As used herein, the term "about" or "between" refers to a ±20% to ±10% variation from the nominal value unless otherwise indicated.

Embodiments of the present disclosure are directed towards an organic resistor. The organic resistor includes a rubber substrate fabricated with a conducting film including a composite of carbon nanotubes and a nickel phthalocyanine complex dispersed in one or more edible oil(s). The carbon nanotubes are used as the conducting element while the nickel phthalocyanine along with edible oil(s) works as a non-conducting element in the organic resistor. The changes in the resistance and impedance of the resistor were measured under the effect of humidity, temperature, pressure, displacement and the frequency of the applied voltage. The results of the study indicate that the organic resistor of the present disclosure show properties of a conductor. This is because, the edible oil(s) in the conducting film provides a flexible jelly-like structure to the organic resistor making it soft and shockproof. The edible oil(s) surrounding the carbon nanotubes and nickel phthalocyanine provide stable constant resistance in the circuit and excellent protection to the components of the organic resistor. Due to such properties, the organic resistor can be mounted on pliable materials as it can withstand the bending and compression applied to it. The organic resistor of the present disclosure is ecologically clean, environment friendly, and can be used in applications such as, but not limited to, reducing the current flow, adjusting signal levels, dividing voltages, bias active elements, and terminating transmission lines as and when required in the electrical circuits. Also, these resistors play an important role in protecting devices by limiting any excess current flow that can damage the devices.

Referring to FIG. 1A, a sandwich-type structure of an organic resistor 100 is disclosed. The organic resistor 100 includes a rubber substrate 102 as the base for providing support to the components of the organic resistor 100. The organic resistor 100 also includes a first layer 104 disposed on the rubber substrate 102. In one embodiment, the first layer 104 is disposed on the rubber substrate 102 by using rubbing-in technology. The first layer 104 includes the carbon nanotubes dispersed in a first edible oil. The first edible oil includes at least one selected from a group consisting of *brassica* oil, seasame oil, almond oil, flaxseed oil, blackseed oil, *cannabis* oil, linseed oil, olive oil and hempseed oil. In an embodiment, the first edible oil is a vegetable oil. In an embodiment, the weight ratio of the carbon nanotubes to the first edible oil to the first edible oil is 1:1. Further, the organic resistor 100 includes a second layer 106 disposed on the first layer 104. In another embodiment, the second layer is disposed over a conductive glass 108. The second composite layer 106 includes the nickel phthalocyanine complex dispersed in a second edible oil. In an embodiment, the weight ratio of the nickel phthalocyanine complex and the second edible oil is 1:1. The second edible oil includes at least one selected from a group consisting of palm karnel oil, palm oil and coconut oil. In an embodiment, the second edible oil is coconut oil. In one embodiment, the first edible oil and the second edible oil may be similar. The first layer 104 and the second layer 106 collectively form the conducting film. In one embodiment, the conducting film may have a thickness in the range of about 36 micrometers (μm) to about 54 μm. In another embodiment, the conducting film may have a thickness in the range of about 42 μm to about 50 μm. In yet another embodiment, the conducting film may have a thickness about 46 μm. The organic resistor 100 may further include a conductive glass 108 disposed on the second layer 106. In other words, the sandwich type structure 100 is configured such that the conducting film is sandwiched between the rubber substrate 102 and the conductive glass 108. The organic resistor 100 also includes a first terminal 110 connected to the conductive glass substrate 108 and a second terminal 112 distant from the first terminal 110 and connected to the first layer 104. In some embodiments, the sandwich-type organic resistor 100 may have a size in the range of about 2:1.5:0.7 cm$^3$.

Figure 1B:
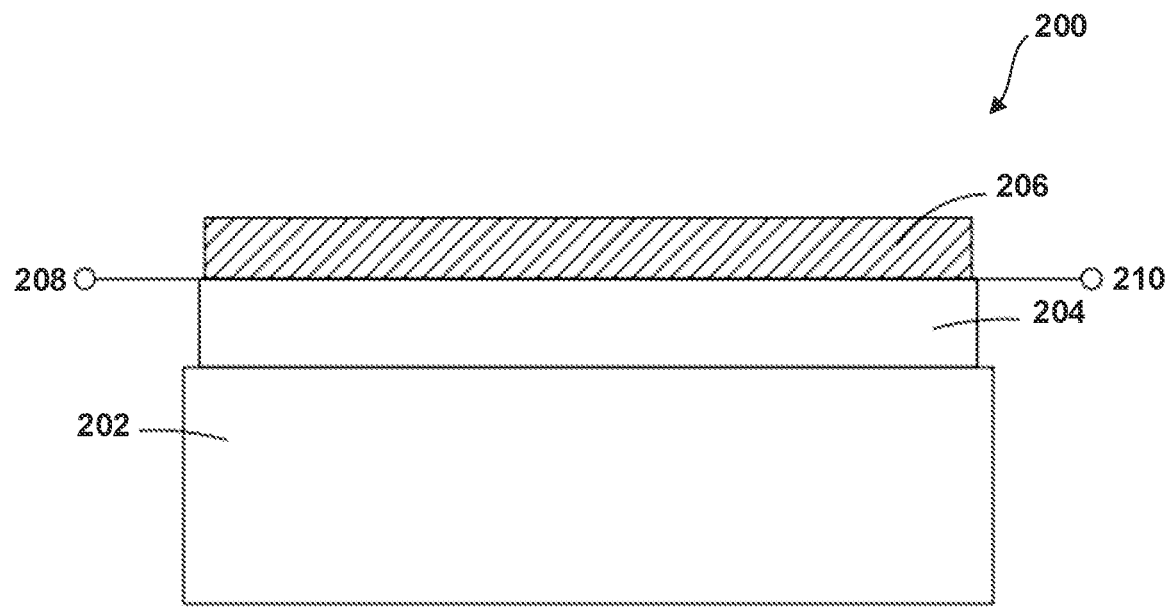
FIG. 1B is a schematic diagram of a surface type structure of an organic resistor.

Referring to FIG. 1B, a surface-type structure of an organic resistor 200 is disclosed. The organic resistor 200 includes a rubber substrate 202 as the base for providing support to the components of the organic resistor 200. The organic resistor 200 also includes a first layer 204 disposed on the rubber substrate 202. The first layer 204 includes the carbon nanotubes dispersed in the first edible oil. The first edible oil includes at least one selected from a group consisting of *brassica* oil, seasame oil, almond oil, flaxseed oil, blackseed oil, *cannabis* oil, linseed oil, olive oil and hempseed oil. In an embodiment, the first edible oil is a vegetable oil. In an embodiment, the weight ratio of the carbon nanotubes to the first edible oil is 1:1. Further, the organic resistor 200 includes a second layer 206 disposed on the first layer 204. The second layer 206 includes the nickel phthalocyanine complex dispersed in the second edible oil. The second edible oil includes at least one selected from a group consisting of palm karnel oil, palm oil and coconut oil. In an embodiment, the second edible oil is coconut oil. In an embodiment, the weight ratio of the nickel phthalocyanine complex and the second edible oil is 1:1. The first layer 204 and the second layer 206 collectively form the conducting film. In one embodiment, the conducting film may have a thickness in the range of about 17 μm to about 29 μm. In another embodiment, the conducting film may have a thickness in the range of about 20-26 μm. In yet another embodiment, the conducting film may have a thickness of about 23 μm. A first terminal 208 and a second terminal 210 are connected to the organic resistor 200 between the first layer 204 and the second layer 206. In one embodiment, the first terminal 208 and the second terminal 210 may be on the same side of the organic resistor 200. In another embodiment, the first terminal 208 and the second terminal 210 may be on the opposite side of the organic resistor 200. In some embodiments, the surface-type organic resistor 200 may have a size in the range of about 2:0.7:0.7 cm$^3$.

The carbon nanotubes, as described in FIG. 1A and FIG. 1B, may be a single-walled carbon nanotube (SWCNT), a double-walled carbon nanotube (DWCNT), a multi-walled carbon nanotube (MWCNT), or a combination thereof. In an embodiment, the carbon nanotubes are multi-walled carbon nanotubes. In one embodiment, each of the multi-walled carbon nanotubes may have a diameter in a range of about 5 nm to about 35 nm. In another embodiment, each of the multi-walled carbon nanotubes may have a diameter in a range of about 10 nm to about 30 nm. In yet another embodiment, each of the multi-walled carbon nanotubes may have a diameter in a range of about 15 nm to about 25 nm. The multi-walled carbon nanotubes provide a stable current supply without dissipating heat. In one embodiment, each of the multi-walled carbon nanotubes may have a length in a range of about 50 nm to about 250 nm. In another embodiment, each of the multi-walled carbon nanotubes may have a length in a range of about 100 nm to about 200 nm. In one embodiment, each of the multi-walled carbon nanotubes may have a length in a range of about 150 nm.

In an aspect, a method of making the organic resistor is disclosed. The method includes depositing the conducting film over the rubber substrate via rubbing-in technology. The rubbing-in technology includes depositing the conducting film over the rubber substrate with the help of a round load. In one embodiment, the round load may be made up of material such as, but not limited to, metal, rubber, polymer, etc. Pressure is applied on the round load to press the conducting film over the rubber substrate for even dispersion of the conducting film. In one embodiment, the round load may be moved in a perpendicular position to disperse the conducting film over the rubber substrate. In another embodiment, the round load may be moved in a circular position to disperse the conducting film over the rubber substrate. The pressure applied by the round load on the conducting film allows to expand the pores present on the surface of the rubber substrate, as a result, the conducting film accumulates over a larger surface area and disperses evenly on the rubber substrate. After the pressure is released, the pores regain their original size and hold the material of the conducting film further strengthening the deposition. The conducting film includes a composite of carbon nanotubes and a nickel phthalocyanine complex dispersed in one or more edible oil(s). In an embodiment, the weight ratio of the composite to the edible oil is in the range of 2:3 to 3:2. In an embodiment, the weight ratio of the composite to the edible oil is 2:3. In another embodiment, the weight ratio of the composite to the edible oil is 3:2. In some embodiments, the values of resistances can be changed by changing geometric parameters such as, thickness and cross-section or by changing concentration of oil with respect to the composite.

In one embodiment, the method includes depositing the conducting film over the rubber substrate at a temperature range of about 22° C. to about 40° C. In another embodiment, the method includes depositing the conducting film over the rubber substrate at a temperature range of about 25° C. to about 37° C. In yet another embodiment, the method includes depositing the conducting film over the rubber substrate at a temperature range of about 28° C. to about 34° C. In one embodiment, the method includes depositing the conducting film over the rubber substrate at a pressure range of about 2 g/cm$^2$ to about 12 g/cm$^2$. In another embodiment, the method includes depositing the conducting film over the rubber substrate at a pressure range of about 4 g/cm$^2$ to about 10 g/cm$^2$. In yet another embodiment, the method includes depositing the conducting film over the rubber substrate at a pressure range of about 6 g/cm$^2$ to about 8 g/cm$^2$. The CNT's are selected from a single-walled carbon nanotube (SWCNT), a double-walled carbon nanotube (DWCNT), a multi-walled carbon nanotube (MWCNT), or a combination thereof. The carbon nanotubes are multi-walled carbon nanotubes, and each of the multi-walled carbon nanotubes has a diameter in a range of about 10 nm to about 30 nm and a length in a range of about 100 nm to about 200 nm.

The organic resistor includes eco-friendly and biologically clean elements forming the composite of the organic resistor and hence it does not cause any environmental harm or pollution without compromising the functionality of the resistors. Further, the organic resistor has a jelly-like structure which allows the resistor to be shockproof and can work under high-pressure tough conditions. The resistors of the present disclosure find potential application in wearable electronic and medical devices.

EXAMPLES

The disclosure will now be illustrated with examples, which are intended to illustrate the working of disclosure and not intended to take restrictively to imply any limitations on the scope of the present disclosure.

Example 1: Process for the Preparation of the Organic Resistor

Materials and Methods

Figure 2:
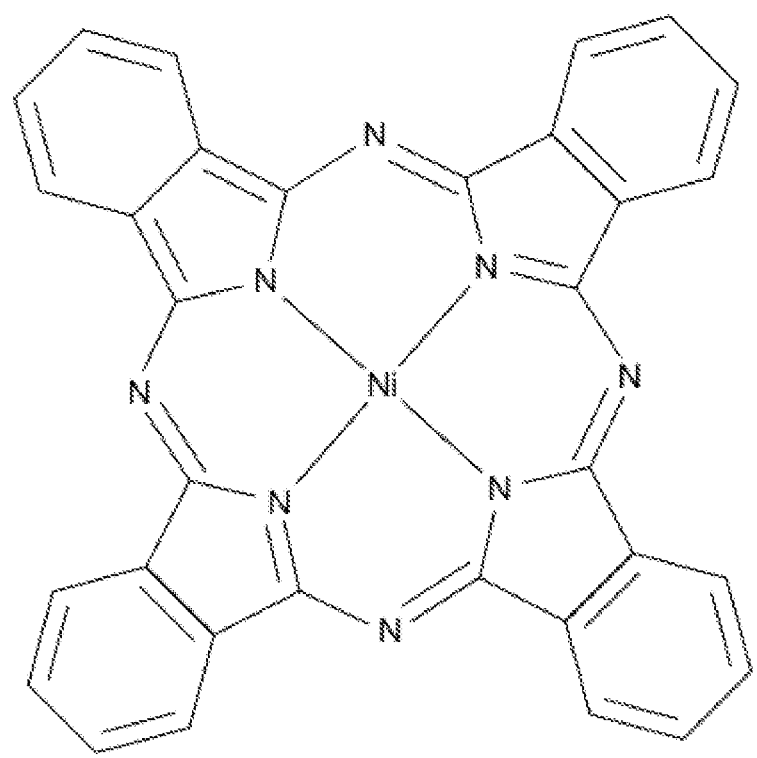
FIG. 2 shows a molecular structure of the nickel phthalocyanine (NiPc)

Edible oil, nickel phthalocyanine (NiPc) which is an organic semiconductor, carbon nanotubes (CNTs), and rubber substrate were used for the fabrication of the organic resistor. The CNTs and NiPc powder were purchased from Sun Nanotek Co. Ltd and Sigma Aldrich™, respectively. The diameter of the multi-walled carbon nanotubes was 10 to 30 nm, while their length was in the range of 100 to 200 nm. The NiPc powder was used as it was received without further purification FIG. 2 shows a molecular structure of the nickel phthalocyanine. The molecular weight of the NiPc is 571.22. The nickel phthalocyanine is a crystalline dark blue powder having a honey comb type molecular structure.

The shockproof organic resistors consisting of the NiPc, the CNT, the edible oil, were fabricated on a rubber substrate by rubbing-in technology. These organic resistors were fabricated as follows: a jelly composite of CNT and edible oil was prepared by mixing 50 wt. % of both CNT and edible oil. A jelly composite of NiPc and edible oil was also prepared by mixing 50 wt. % of both NiPc and edible oil. The jelly composite of CNT and edible oil was deposited on the rubber substrates by rubbing-in technology. The jelly composite of NiPc and edible oil was deposited on the flexible conductive glass or jelly composite of CNT. The effects of pressure, displacement, humidity, temperature, and vibrations on the resistance and impedance of the organic resistor were measured.

Results and Discussion

Examination of Optical Characteristics

Figure 3:
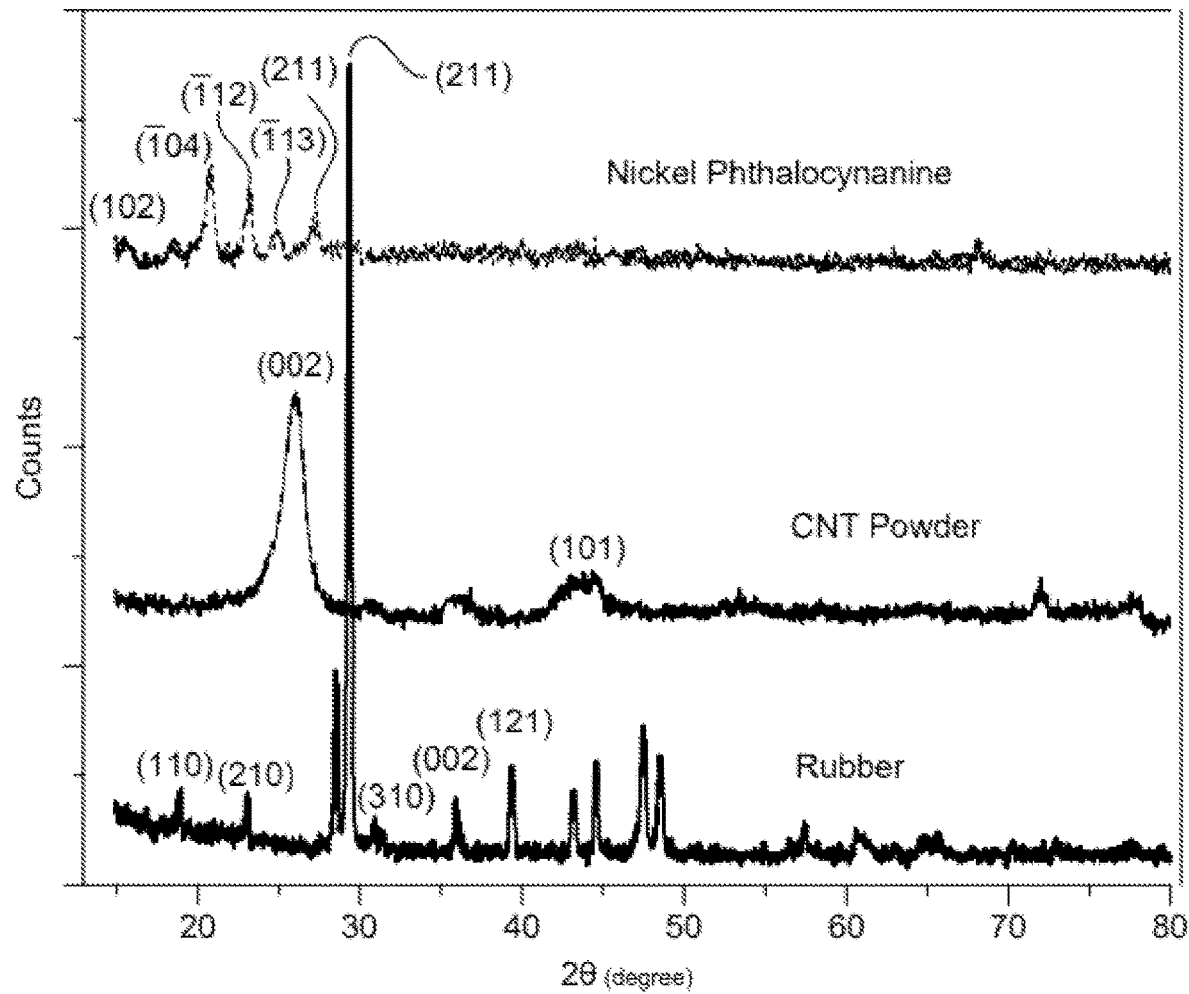
FIG. 3 shows X-Ray Diffraction (XRD) studies of NiPc-edible oil composite, CNT-edible oil composite, and rubber substrate.
Figure 4A:
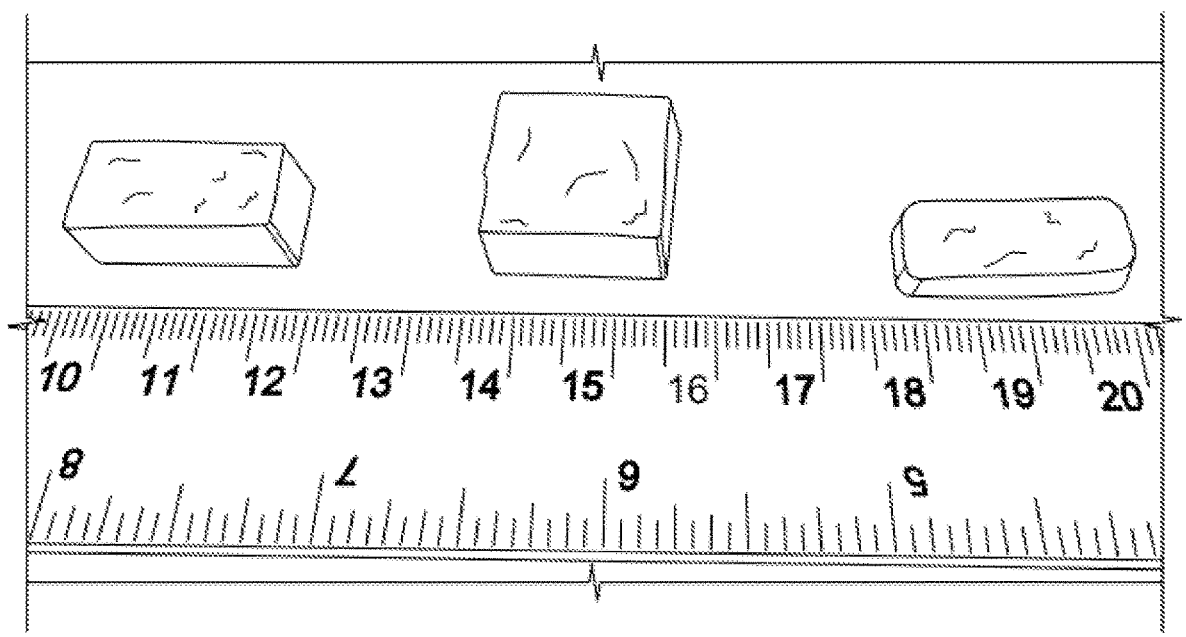
FIG. 4A shows three-dimensional (3D) images of the rubber substrate covered with the CNT-edible oil composite and the NiPc-edible oil composite.
Figure 4B:
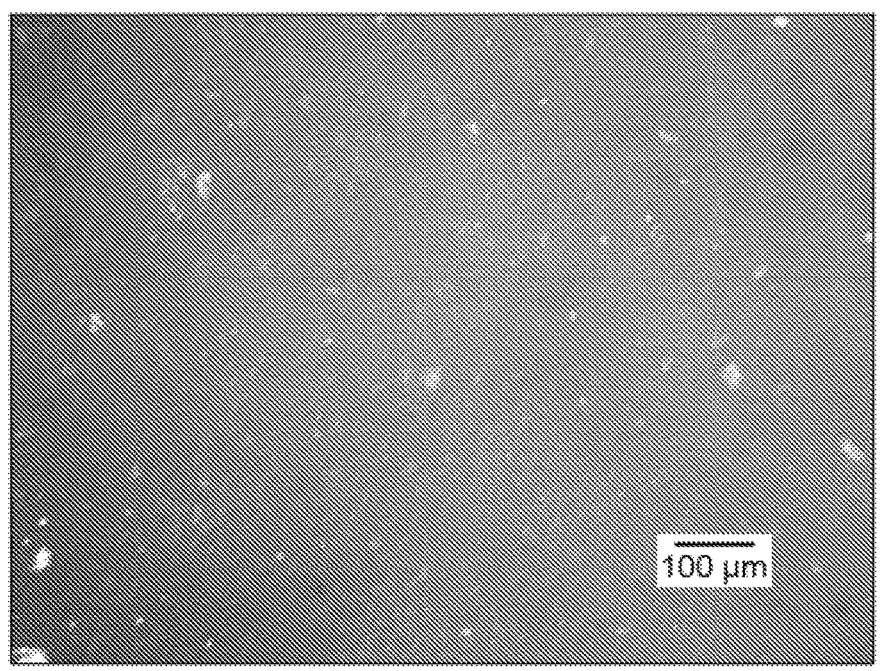
FIG. 4B shows a magnified image of the top surface of the rubber substrate covered with the CNT-edible oil composite and the NiPc-edible oil composite.

FIG. 3 shows X-Ray Diffraction (XRD) studies of NiPc-edible oil composite (second layer), CNT-edible oil composite (first layer), and rubber substrate. The Philips™ PW1830 x-ray system was used in θ-2θ (Bragg-Brentano) scan mode using Cu-Kα radiation (monochromatic) with 40 kV (accelerating voltage) and 25 mA (tube current) at room temperature. The scanning was done in a 2θ range of 15° to 80°, while the step size was 0.05°. To confirm the repeatability, the samples of rubber, orange dye, and transparent jelly were scanned three times. FIG. 4A shows three-dimensional (3D) images of the rubber substrate covered with the CNT-edible oil composite and the NiPc-edible oil composite. In these images, the front, top and side views of the rubber substrates can be seen. FIG. 4B shows a magnified image of the top surface of the rubber substrate covered with the CNT-edible oil composite and the NiPc-edible oil composite.

Further, the sandwich-type structure and surface-type structure samples were fabricated for the experiments. The total thickness of the conducting film was in the range of about 42 µm to about 50 µm in sandwich-type structure samples and about 20 µm to about 26 µm in the surface type structure samples. The sizes of the sandwich-type structure and the surface-type structure samples were equal to 2:1.5: 0.7 $cm^3$ and 2:0.7:0.7 $cm^3$, accordingly. In the sandwich-type structure samples, the displacement and pressure were applied perpendicular to the surface of the conducting film. In the surface-type structure samples, unlike to sandwich-type structure, the displacement and pressure were applied along of length of the conducting film.

For the measurements of the impedance in the range of frequencies from 100 Hz to 200 kHz the digital LCR meter, MT-4090 was used. The temperature was measured using a Fluke-87 multimeter, while the humidity was measured using a Fisher Scientific humidity meter. The samples' resistance and impedance were investigated under the effect of displacement, pressure, humidity, temperature, and mechanical vibrations. The resistances and the impedances of the surface type samples were equal to 2.2 kΩ, on average. The resistance of the sandwich-type samples was 3 times less on average.

Figure 5:
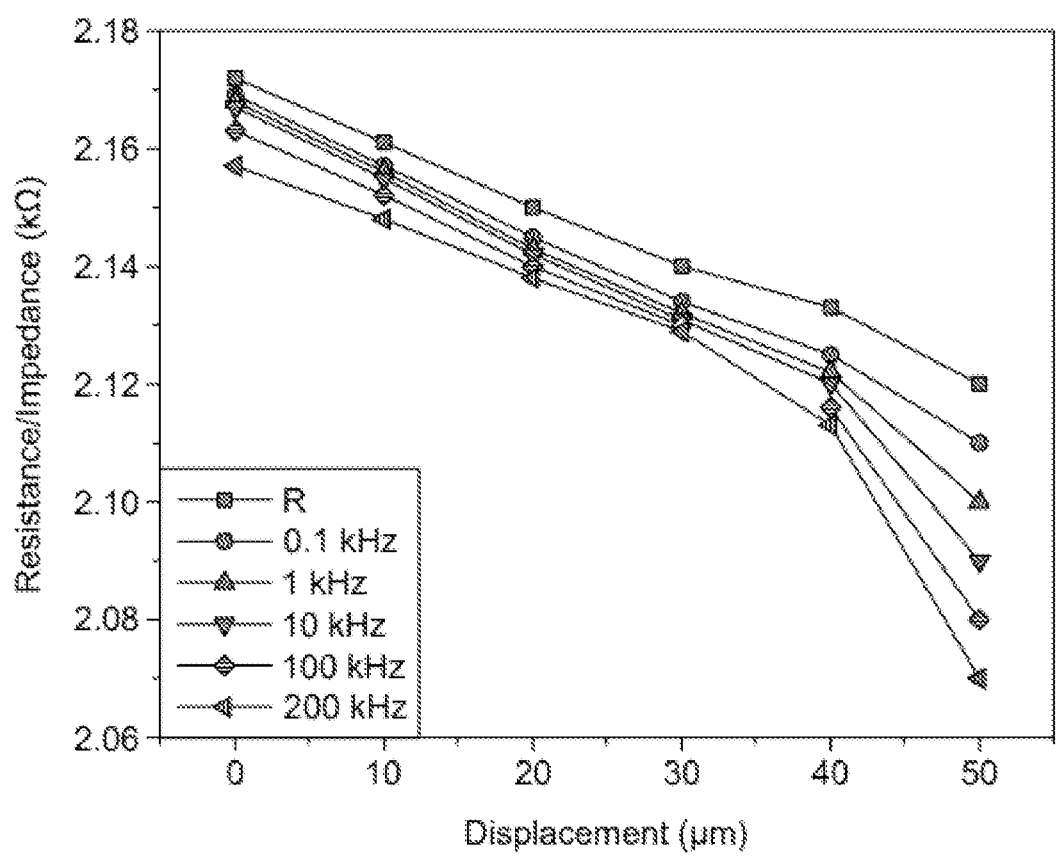
FIG. 5 shows a relationship of resistance/impedances of the organic resistor with compressive displacements at various frequencies.
Figure 6:
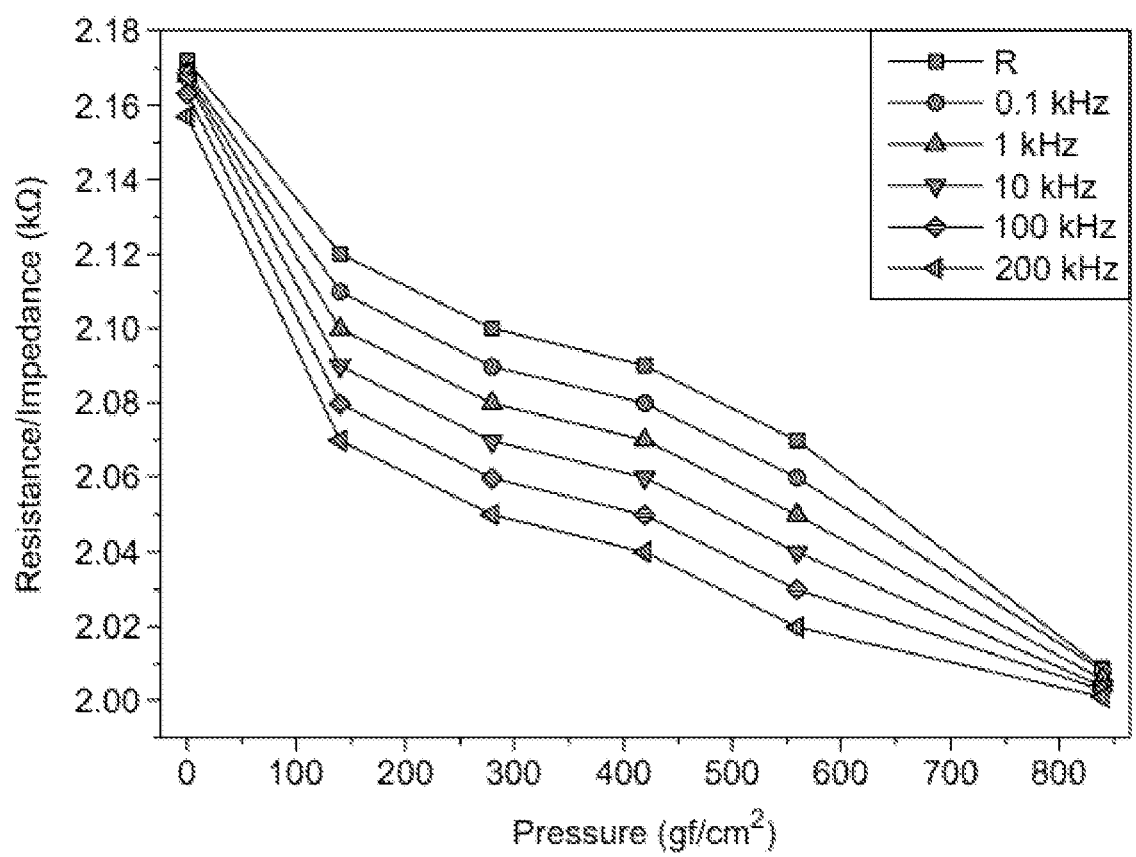
FIG. 6 shows a relationship of resistance/impedances of the organic resistor with pressure at various frequencies.
Figure 7:
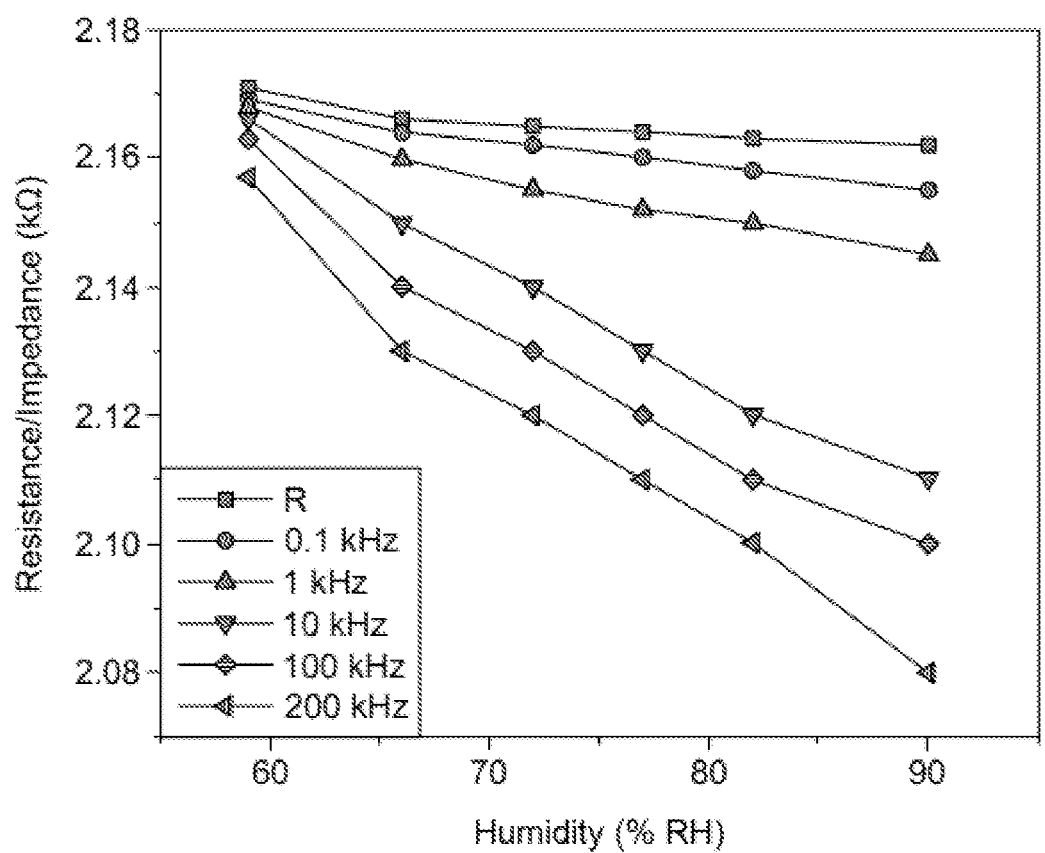
FIG. 7 shows a relationship of resistance/impedances of the organic resistor with humidity at various frequencies.
Figure 8:
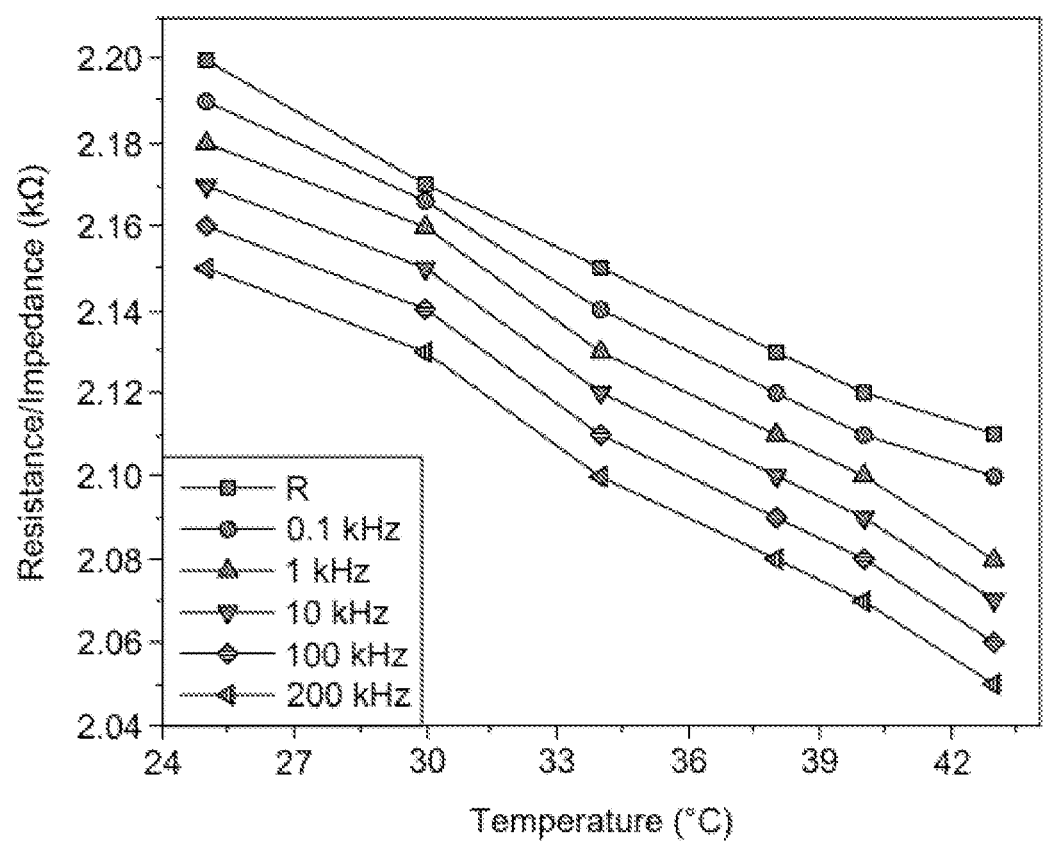
FIG. 8 shows a relationship of resistance/impedances of the organic resistor with the temperature at various frequencies.
Figure 9:
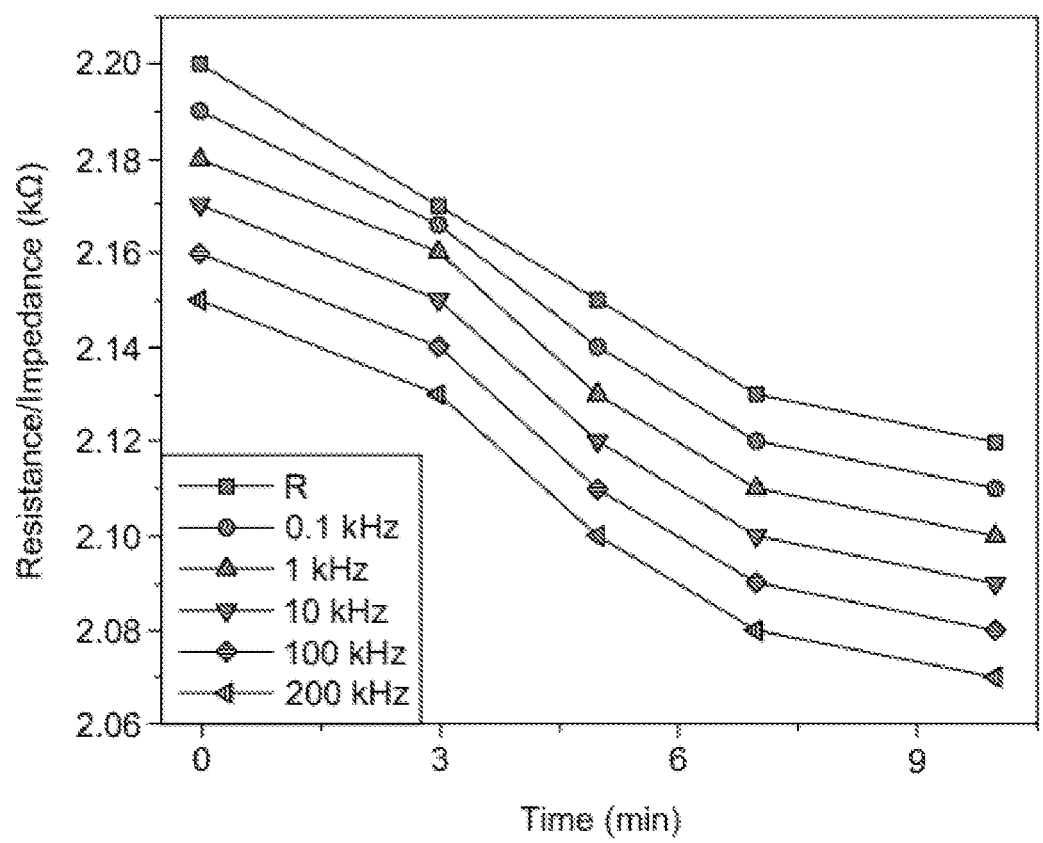
FIG. 9 shows the effect of vibration on the resistance and the impedance of the organic resistor.

FIG. 5 shows a relationship of resistance/impedances of the organic resistor with compressive displacements at various frequencies (0.0 KHz to 200 KHz). As the compressive displacement increased from 0 to 50 µm, the resistance and impedances decreased 1.04 times on average, at all frequency ranges, namely −0.1 KHz, 1 KHz, 10 KHz, 100 KHz, and 200 KHz. The comparison of the resistors of the present disclsoure with the conventional resistors showed that within the experimental errors their values of resistances are close to each other. The decrease in resistance or impedance can be easier to minimize by the increase of the CNT content with respect of NiPc content within 10 wt. %. On the other hand the resistors of the present disclosure have a number of advantages in that they are flexible and shockproof, and the materials are environmentally friendly. Using only the dry ingredients (just as a composite of nickel phthalocyanine complex and the carbon nanotubes without the edible oil) resulted in degradation of the resistor. Oil by formation of the flexible composite allow retaining the initial properties of the organic resistor at flexing conditions. From the results, it was observed that the deformation, changing of temperature, pressure and displacement may bring to irreversible changing of the properties i.e., degradation of the properties of the resistor. FIG. 6 shows a relationship of resistance/impedances of the organic resistor with pressure at various frequencies. Under the effect of pressure from 0 to 850 $gf/cm^2$ resistance and impedances decreased 1.08 times on average, at all frequency ranges, namely −0.1 KHz, 1 KHz, 10 KHz, 100 KHz, and 200 KHz. The comparison of the resistors of the present disclsoure with the conventional resistors showed that within the experimental errors their values of resistances are close to each other. FIG. 7 shows a relationship of resistance/impedances of the organic resistor with humidity at various frequencies. Increasing humidity from 60% to 90% RH (relative humidity) the resistance and the impedances of the samples were decreased up to 1.04 times, at all frequency ranges, namely −0.1 KHz, 1 KHz, 10 KHz, 100 KHz, and 200 KHz. The comparison of the resistors of the present disclsoure with the conventional resistors showed that within the experimental errors their values of resistances are close to each other. FIG. 8 shows a relationship of resistance/impedances of the organic resistor with the temperature at various frequencies. Increasing temperature from 25° C. to 43° C. the average decrease in the resistance and the impedances were equal to 1.05 on average, at all frequency ranges, namely −0.1 KHz, 1 KHz, 10 KHz, 100 KHz, and 200 KHz. The comparison of the invented resistors with the conventional resistors showed that within the experimental errors the resistances are the same within of experimental errors. FIG. 9 shows the effect of vibration on the resistance and the impedance of the organic resistor. Under the effect of vibration, the decrease in the resistance and the impedances was also observed up to 1.03 times, at all frequency ranges, namely –0.1 KHz, 1 KHz, 10 KHz, 100 KHz, and 200 KHz. The comparison of the invented resistors with conventional resistors showed that within the experimental errors the resistances and their behavior are the same. Practically all components of the resistors: the CNT, NiPc and oil are carbon containing, therefore environmentally friendly materials.

The results obtained on sandwich-type samples were actually similar to data received in the surface-type samples. The investigated samples potentially can be used as a prototype for the development of shockproof jelly electronic-based devices, in particular, sensors. The impedances and resistances may be changed as well if the ratio of the ingredients and of kind of ingredients are changed. Technological achievement on the fabrication of these devices is the use of edible organic oil which allowed to fabricate the uniform jelly-type films of organic materials, that could not be realized only by mixing of "dry" ingredients. that the use of edible organic oil is environmentally friendly, unlike some other inorganic oils which are conventionally used in practice.

An analogous to the temperature coefficient of resistance (TCR):

$$TCR=\Delta R/R\Delta T \quad (1)$$

and $\Delta R$ is the differences of resistances between temperatures $T_1$ (initial temperature) and $T_2$ (instantaneous temperature). The $\Delta T$ is the difference between initial and instantaneous and $\Delta R$ is the differences of resistances between temperatures $T_1$ (initial temperature) and $T_2$ (instantaneous temperature). The $\Delta T$ is the difference between initial and instantaneous temperatures.

Similarly, the temperature coefficient of impedance (TCI) can be introduced as well:

$$TCI=\Delta Z/Z\Delta T \quad (2)$$

where, $Z$, $\Delta Z$, and $\Delta T$ are impedance, change in impedance at different temperatures, and change in temperature $\Delta T$.

By calculations, it was found that TCR is equal to $-0.0023/°$ C. In the same way, it was found that the temperature coefficient of impedance (TCI) was equal to $-0.0023/°$ C. at all frequencies in the interval of 0.1 kHz-200 kHz.

Comparison of these values of the temperature coefficient of impedance on temperature with the TCRs of some metals that are used in electronics, for example, silver (0.0038), copper (0.0039), and aluminum (0.0043) shows that the resistance-temperature behavior of the NiPc-CNT-oil-rubber composite is similar to metals. However, the resistance-temperature behavior of NiPc-CNT-oil-rubber composite is like semiconductors, allowing fabrication of the jelly-like and traditional metals-based composites with approximately zero temperature coefficients.

The analysis of data received from the literature showed that the obtained results (presented work) would be supplementary. These results are useful first of all for the fabrication of cheap and flexible devices, which is especially important as a teaching aid. Secondly, the investigation and understanding of the physical and electrochemical properties of the organic resistor have potential application in electronic devices, especially, in conditions where there are high vibrations. The organic resistor of the current invention provides a cheap and effective resistor to be used without causing any damage to the environment.

INDUSTRIAL APPLICABILITY

The organic resistor of the present disclosure offers several advantages. One advantage of the embodiments according to the present disclosure is that the resistor's fabrication technology is ecologically clean, environmentally friendly. Also, the materials used for fabrication are cost effective, and environmentally friendly. Another advantage of the organic resistor is its stability (120 hours). The organic resistor of the present disclosure is flexible—changing the ratio of the ingredients (carbon nanotube, organic semiconductor (nickel phthalocyanine and edible oil) results in changing the electric (resistances) and mechanical parameters (flexibility, weight) of the devices.

It is understood that the examples, embodiments, and teachings presented in this application are described merely for illustrative purposes. Any variations or modifications thereof are to be included within the scope of the present application as discussed.

The invention claimed is:

1. An organic resistor comprising:
   a rubber substrate; and
   a conducting film disposed over the rubber substrate, wherein the conducting film comprises a composite of carbon nanotubes and a nickel phthalocyanine complex dispersed in one or more edible oil(s), and wherein a weight ratio (w/w) of the composite to the one or more edible oil(s) is in a range of 2:3 to 3:2.

2. The organic resistor according to claim 1, comprising a surface-type structure or a sandwich-type structure.

3. The organic resistor according to claim 2, wherein the conducting film comprises:
   a first layer disposed on the rubber substrate, wherein the first layer comprises the carbon nanotubes dispersed in a first edible oil; and
   a second layer is disposed on the first layer, wherein the second layer comprises a nickel phthalocyanine complex dispersed in a second edible oil.

4. The organic resistor according to claim 3, wherein the sandwich-type structure further comprises a conductive glass disposed over the second layer.

5. The organic resistor according to claim 1, wherein each carbon nanotubes has a diameter in a range of 10 to 30 nanometers.

6. The organic resistor according to claim 1, wherein each of the carbon nanotubes has a length in a range of 100 to 200 nanometers.

7. The organic resistor according to claim 3, wherein a weight ratio of the carbon nanotubes to the first edible oil is 1:1, and wherein a weight ratio of the nickel phthalocyanine complex to the second edible oil is 1:1.

8. The organic resistor according to claim 1, having a stability for up to 120 days.

9. The organic resistor according to claim 2, wherein the surface-type resistor having a size in the range of 2:0.7:0.7 $cm^3$, and wherein the sandwich-type resistor having a size in the range of 2:1.5:0.7 $cm^3$.

10. The organic resistor according to claim 2, wherein the conducting film has a thickness in the range of 20-26 micrometers ($\mu m$) for the surface-type structure, and a thickness in the range of 42-50 $\mu m$ for the sandwich-type structure.

11. A method of making an organic resistor, the method comprising: depositing a conducting film over a rubber substrate via rubbing-in technology, wherein the conducting film comprises a composite of carbon nanotubes and a nickel phthalocyanine complex dispersed in one or more edible oil(s), and wherein a weight ratio (w/w) of the composite to the one or more edible oil(s) is in a range of 2:3 to 3:2, to obtain the organic resistor.

12. The method according to claim 11 further comprising, depositing the conducting film over the rubber substrate at a temperature range of 25-37° C. and at a pressure of 4-10 g/cm$^2$.

13. The method according to claim 11, wherein the carbon nanotubes are selected from a single-walled carbon nanotube (SWCNT), a double-walled carbon nanotube (DWCNT), a multi-walled carbon nanotube (MWCNT), or a combination thereof.

14. The method according to claim 13, wherein the carbon nanotubes are multi-walled carbon nanotubes, and wherein each of the multi-walled carbon nanotubes has a diameter in a range of 10 to 30 nanometers, and a length in a range of 100 to 200 nanometers.

\* \* \* \* \*

UNITED STATES PATENT AND TRADEMARK OFFICE
CERTIFICATE OF CORRECTION

| | |
|---|---|
| PATENT NO. | : 11,721,455 B1 |
| APPLICATION NO. | : 18/156716 |
| DATED | : August 8, 2023 |
| INVENTOR(S) | : Muhammad Tariq Saeed Chani et al. |

It is certified that error appears in the above-identified patent and that said Letters Patent is hereby corrected as shown below:

In the Specification

Please add the funding acknowledgment at Column 10, Line 16, just before the claims as follows:
ACKNOWLEDGMENT
The authors extend their appreciation to the Deputyship for Research & Innovation, Ministry of Education in Saudi Arabia for funding this research work through the project number "091-2021" and King Abdulaziz University, DSR, Jeddah, Saudi Arabia.

Signed and Sealed this
Twenty-eighth Day of November, 2023

Katherine Kelly Vidal
*Director of the United States Patent and Trademark Office*